United States Patent
Sakatani et al.

(10) Patent No.: US 6,884,753 B2
(45) Date of Patent: Apr. 26, 2005

(54) METHOD FOR PRODUCING CERAMIC DISPERSION COMPOSITION

(75) Inventors: Yoshiaki Sakatani, Niihama (JP); Kensen Okusako, Niihama (JP); Hironobu Koike, Saijo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/438,813

(22) Filed: May 16, 2003

(65) Prior Publication Data

US 2003/0220194 A1 Nov. 27, 2003

(30) Foreign Application Priority Data

| May 27, 2002 | (JP) | ................................ 2002-151968 |
| Oct. 22, 2002 | (JP) | ................................ 2002-306672 |
| Feb. 26, 2003 | (JP) | ................................ 2003-048951 |

(51) Int. Cl.$^7$ .................. B01J 23/00; B01J 31/00; C04B 35/00; B01F 17/00; C01G 23/047

(52) U.S. Cl. .................. 502/350; 502/150; 502/172; 502/506; 501/1; 501/134; 516/79; 516/88; 516/90; 423/610

(58) Field of Search .............. 501/1, 134, 928; 516/79, 88, 90; 502/150, 172, 350, 506; 423/610

(56) References Cited

U.S. PATENT DOCUMENTS

| 2,480,092 A | | 8/1949 | Whately |
| 4,165,239 A | | 8/1979 | Linden et al. |
| 4,764,357 A | * | 8/1988 | Sherif et al. ................ 505/440 |
| 5,011,674 A | | 4/1991 | Yoshimoto et al. |
| 5,919,347 A | * | 7/1999 | Gal-Or et al. ................ 204/484 |
| 6,013,372 A | | 1/2000 | Hayakawa et al. |
| 6,068,828 A | * | 5/2000 | Hata et al. ................ 423/608 |
| 6,576,344 B1 | * | 6/2003 | Doushita et al. ............ 428/426 |
| 2002/0005145 A1 | | 1/2002 | Sherman |
| 2002/0012628 A1 | | 1/2002 | Sawabe et al. |
| 2002/0021999 A1 | | 2/2002 | Sakatani et al. |
| 2002/0051746 A1 | | 5/2002 | Okusako |
| 2003/0027704 A1 | * | 2/2003 | Sakatani et al. ............... 501/1 |
| 2003/0124050 A1 | * | 7/2003 | Yadav et al. ............. 423/592.1 |
| 2003/0161784 A1 | | 8/2003 | Okusako et al. |
| 2004/0106508 A1 | * | 6/2004 | Scheying et al. ............. 501/99 |
| 2004/0112250 A1 | * | 6/2004 | Thetford ................... 106/31.28 |

FOREIGN PATENT DOCUMENTS

| EP | 0 666 107 A2 | 8/1995 |
| EP | 44 10 662 C1 | 9/1995 |
| EP | 0 675 086 A2 | 10/1995 |
| EP | 0 846 494 A1 | 6/1998 |

(Continued)

OTHER PUBLICATIONS

Lei et al., "Studies on Process Conditions of Preparing Nano–Titanium Dioxide with Homogenous Precipitation Method", *Inorganic Chemicals Industry*, vol. 33, No. 2, Mar. 2001, pp. 3–5, with English translation.

(Continued)

Primary Examiner—Mark L. Bell
Assistant Examiner—Patricia L. Hailey
(74) Attorney, Agent, or Firm—Sughrue Mion, PLLC

(57) ABSTRACT

The present invention provides a method for producing a ceramic dispersion composition, the method comprising the step of heating a mixture of a ceramic powder having a photocatalytic activity, a dispersant and a solvent at a temperature of about 70° C. or higher without substantially letting the solvent out of the reaction system. The ceramic dispersion composition can be used for providing a film showing a high hydrophilicity by light irradiation.

5 Claims, 1 Drawing Sheet

FOREIGN PATENT DOCUMENTS

| | | |
|---|---|---|
| EP | 1 031 538 A1 | 8/2000 |
| EP | 1 065 169 A1 | 1/2001 |
| EP | 1 095 908 A1 | 5/2001 |
| EP | 1 127 844 A1 | 8/2001 |
| EP | 1 138 634 A1 | 10/2001 |
| EP | 1 160 202 A1 | 12/2001 |
| EP | 1 174 392 A1 | 1/2002 |
| EP | 1 178 011 A1 | 2/2002 |
| EP | 1 188 718 A2 | 3/2002 |
| EP | 1 199 103 A2 | 4/2002 |
| EP | 1 205 244 A1 | 5/2002 |
| EP | 1 219 569 A2 | 7/2002 |
| EP | 1 279 643 A2 | 1/2003 |
| EP | 1 285 953 A1 | 2/2003 |
| EP | 1 338 564 A2 | 8/2003 |
| FR | 2 677 012 A1 | 12/1992 |
| JP | 62-207718 A | 9/1987 |
| JP | 06-056505 * | 3/1994 ........... C04B/35/00 |
| JP | 10-67516 A | 3/1998 |
| JP | 2000-140636 A | 5/2000 |
| JP | 2001-096168 A | 4/2001 |
| JP | 2001-098220 A | 4/2001 |
| JP | 2001-278627 A | 10/2001 |
| JP | 2003-048715 A | 2/2003 |
| JP | 2003-171578 A | 6/2003 |
| JP | 2003-221230 A | 8/2003 |
| WO | WO 96/29375 A1 | 9/1996 |
| WO | WO 00/10921 A1 | 3/2000 |
| WO | WO 00/18686 A1 | 4/2000 |
| WO | WO 01/56928 A1 | 8/2001 |
| WO | WO 02/40609 A1 | 5/2002 |

OTHER PUBLICATIONS

Shinri Sato, "Photocatalytic Activity of $NO_x$–Doped $TiO_2$ in the Visible Light Region", *Chemical Physics Letters*, vol. 123, No. 1,2, Jan. 3, 1986, pp. 126–128.

E. Kanekazi et al., "Solid–state Chemistry of Thermally Induced Yellow Coulouring in Synthetic Hydrous Titanium Oxide fromTiCl3", J. Chem. Soc. Faraday Trans., vol. 88, No. 24, 1992, pp. 3583–3586, no month.

Abstract of Fang et al., "Preparation of fine spherical titania particles by thermolysis of the peroxo complex", STN Chemical Abstracts, vol. 120, No. 8, Feb. 21, 1994 (XP–002139805).

Patent Abstracts of Japan, vol. 1997, No. 07, Jul. 31, 1997 (corresponding to JP 09–071418).

Database WPI, Section Ch, Week 199802, Derwent Publications, Ltd., XP002268023 corresponding to JP 09–278443.

M. Miyauchi et al., "Reversible wettability control of $TiO_2$ surface by light irradiation," *Surface Science*, 511, (2002), pp. 401–407, no month.

R. Asahi et al., "Visible–Light Photocatalysis in Nitrogen–Doped Titanium Oxides", *Science*, vol. 293, Jul. 31, 2001, pp. 269–271.

* cited by examiner

METHOD FOR PRODUCING CERAMIC DISPERSION COMPOSITION

FIELD OF THE INVENTION

The invention relates to a method for producing a ceramic dispersion composition, more particularly to a method for producing a ceramic dispersion composition suitable for a coating for providing a photocatalytic film.

BACKGROUND OF THE INVENTION

Recently, the technology to prevent stains on the surface of a variety of materials by providing the surface with hydrophilic property using a photocatalytic activity has drawn an attention (see, Japanese Patent Application Laid-Open No. 9-57912), and coating agents for providing hydrophilic films on the surface of materials have been commercially available. However, the films made from the coating agents have not shown a hydrophilicity enough to sufficiently prevent stains under the light irradiation. Especially, when utilized indoors, the films made from the coating agents have sometimes had an insufficient hydrophilicity under light irradiation by illuminator.

SUMMARY OF THE INVENTION

One of objects of the present invention is to provide a method for producing a ceramic dispersion composition which provides a film having a high hydrophilicity under light irradiation by illuminator.

In order to improve hydrophilicity of the film made from the ceramic dispersion composition, the inventors of the present invention have investigated a method for producing a ceramic dispersion composition which provides a high hydrophilicity, and have accomplished the present invention.

The present invention provides a method for producing a ceramic dispersion composition, the method comprising the step of heating a mixture of a ceramic powder having a photocatalytic activity, a dispersant and a solvent at a temperature of about 70° C. or higher without substantially letting the solvent out of the reaction system.

DESCRIPTION OF THE PREFERRED EMBODIMENTS

Figure 1:
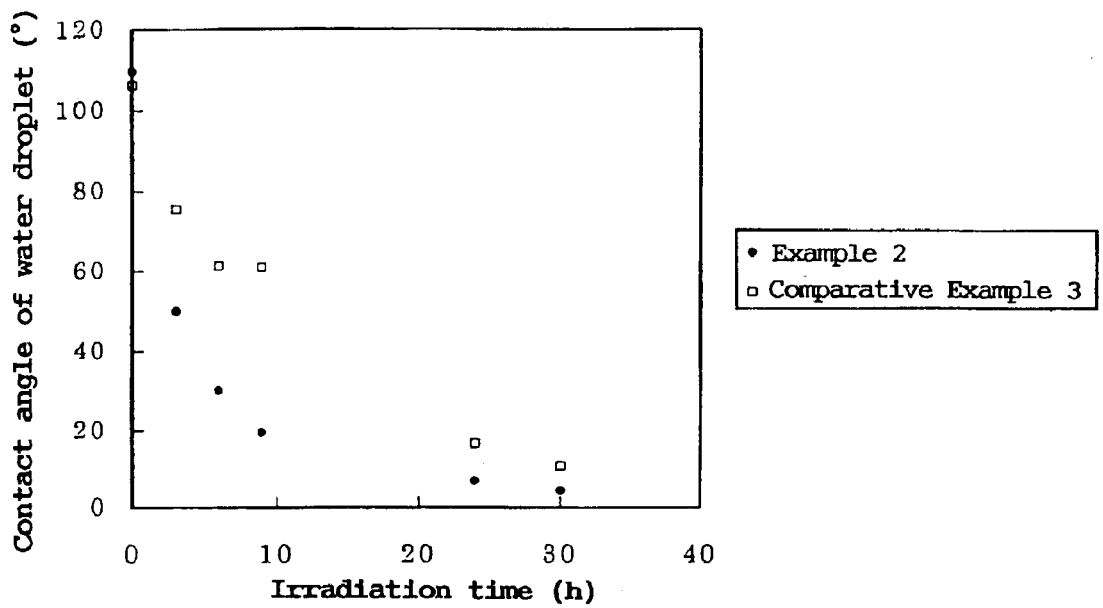
FIG. 1 shows the evaluation results of hydrophilicity of films made from titanium oxide dispersions obtained in Example 2 and Comparative Example 3.

A ceramic powder to be employed in a ceramic dispersion composition of the present invention may be a ceramic powder containing a component which shows photocatalytic activity. The examples of the component include one or more of oxides, nitrides, sulfides, oxy nitrides, oxysulfides, nitrogen fluorides, oxyfluorides, oxyfluoronitrides and the like of a metal such as Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La and Ce. Among them, it is preferred to use an anatase-type or a rutile-type titanium oxide. When an anatase-type titanium oxide is used, the ratio indicating an anatase-type titanium oxide content is preferably about 40% or higher, more preferably about 60% or higher, and most preferably about 80% or higher. The ratio indicating an anatase-type titanium oxide content can be obtained by measuring a diffraction spectrum of the titanium oxide in accordance with x-ray diffractometry and then calculating the peak area of the maximum intensity (Miller indices 101) in the spectrum.

The amount of the ceramic powder in a ceramic dispersion composition of the present invention may be adjusted so that the ceramic content in the ceramic dispersion composition may be about 0.1% by weight or more, preferably about 1% by weight or more, and may be about 30% by weight or less, based on the ceramic dispersion composition, although a ceramic dispersion composition having a ceramic content larger than the above-described content is within the scope of the present invention. When a ceramic dispersion composition has a large content of ceramic, a mixing of the ceramic in the ceramic dispersion composition (the mixing being described in detail below), especially a mixing in an initial period of time can be efficiently carried out. When a ceramic dispersion composition is prepared so as to have a large ceramic content, the ceramic dispersion composition may be diluted in a post-process by adding a solvent to adjust the content to be in the above-described content.

A ceramic powder to be employed in the present invention is preferably a ceramic powder showing a photocatalytic activity by irradiation of light with a wavelength of from about 430 nm to about 830 nm. For example, when a preferable ceramic powder and an acetaldehyde are put in a sealed container and are irradiated by a light with a wavelength of from about 430 nm to about 830 nm using a light source (such as a 500 W xenon lamp) which is placed at a distance of about 15 cm away from the ceramic powder, the average decomposition rate of the acetaldehyde for 20 minutes (i.e., the average decomposition rate in the passage of time from the starting of the irradiation till about 20 minutes later) may be about 10 $\mu$mol/h or higher, and is preferably about 20 $\mu$mol/h or higher, per 1 g of the ceramic powder.

A ceramic powder to be employed in the present invention may have an average primary particle diameter of about 500 nm or smaller and/or an average secondary particle diameter of about 15 $\mu$m or smaller.

When a titanium oxide showing a photocatalytic activity is used as a ceramic powder, the ceramic powder can be produced in a method, for example, by reacting a titanium compound with a base, adding an ammonia thereto, aging the resulting product, separating the aged product by a solid-liquid separation, and calcining the separated solids. In this method, for example, a titanium trichloride ($TiCl_3$), a titanium tetrachloride ($TiCl_4$), a titanium sulfate [$Ti(SO_4)_2 \cdot mH_2O$, $0 \leq m \leq 20$], a titanium oxysulfate [$TiOSO_4 \cdot nH_2O$, $0 \leq n \leq 20$] and/or titanium oxychloride [$TiOCl_2$] is/are used as the titanium compound; and a sodium hydroxide, a potassium hydroxide, a sodium carbonate, a potassium carbonate, an ammonia, a hydrazine, a hydroxyamine, a monoethanolamine, an acyclic amine compound and/or an alicyclic amine compound is/are used as a base to be reacted with a titanium compound. The reaction of a titanium compound with a base may be carried out at a pH of about 2 or higher, preferably at a pH of about 3 or higher, and may be carried out at a pH of about 7 or lower, preferably at a pH of about pH about 5 or lower. The reaction temperature may be about 90° C. or lower, is preferably about 70° C. or lower, and is more preferably 55° C. or lower. The reaction may be carried out in the presence of a hydrogen peroxide. Aging may be carried out by a method, for example, of maintaining the product obtained after adding an ammonia to the reaction product, while stirring, at a temperature of about 0° C. or higher, preferably at a temperature of about 10° C. or higher, and at a temperature of about 110° C. or lower, preferably at a temperature of about 80° C. or lower, more preferably at a temperature of 55° C. or lower. The aging may be conducted for about 1 minute or longer, preferably for about 10 minutes or longer, and may be for about 10 hours or shorter, preferably for about 2 hours or shorter. When an ammonia is used for a reaction with a titanium compound as well as for aging, the total amount of ammonia used for the above-mentioned reaction and the above-mentioned aging is preferably an amount exceeding the stoichiometric amount of a base necessary to convert the titanium compound into a titanium hydroxide in the presence of water. For example, based on the stoichiometric amount, the total amount of ammonia is preferably at least about 1.1 times by mole, and is more preferably at least about 1.5 times by mole. On the other hand, even if the amount of the base is increased, it may be difficult to have an effect in proportion to the amount and, therefore, the amount is preferably about 20 times by mole or smaller, more preferably about 10 times by mole or smaller. The solid-liquid separation of the aged product can be carried out by a pressure filtration, a vacuum filtration, a centrifugal filtration, a decantation or the like. After the solid-liquid separation, it is preferred to carry out rinsing the obtained solids. After such an optional rinsing, the solids separated by solid-liquid separation may be calcined using a pneumatic conveying furnace, a tunnel furnace, a rotary furnace and the like. The calcination may be carried out at a temperature of about 300° C. or higher, preferably at a temperature of about 350° C. or higher, and may be carried out at a temperature of about 600° C. or lower, preferably at a temperature of about 500° C. or lower, and more preferably at a temperature of about 400° C. or lower. The period of time for the calcinaiton varies depending on the calcination temperature, the calcinaiton apparatus and the like, and is not limited. The period of time for the calcinaiton may be for about 10 minutes or longer, is preferably for about 30 minutes or longer, and may be for about 30 hours or shorter, is preferably for about 5 hours or shorter. If necessary, the titanium oxide obtained after the calcination may support a solid acidic compound such as a tungsten oxide, a niobium oxide, an iron oxide and a nickel oxide; a solid basic compound such as a lanthanum oxide and a cerium oxide; and/or a metal compound absorbing visible light, such as an indium oxide ans a bismuth oxide.

When a ceramic powder to be used in the present invention is a tungsten oxide ($WO_3$), the ceramic powder may be obtained by, for example, a method of calcining a tungsten compound such as an ammonium metatungstate. The calcination may be carried out under conditions in which the tungsten compound can be converted into a tungsten oxide. For example, the calcination may be carried out at a temperature of from about 250° C. to about 600° C. in air. In the case that a niobium oxide ($Nb_2O_5$) is used as a ceramic powder in the present invention, the ceramic powder may be obtained by, for example, a method of calcining a niobium compound such as a niobium hydrogen oxalate, or a method of dissolving a niobium alkoxide such as a niobium pentaethoxide and a niobium isopropoxide in an alcohol, mixing the resulting solution with an acidic solution containing an inorganic acid and alcohol, concentrating the obtained mixture to obtain a viscous solution, and then calcining the solution. When a ceramic powder to be used in the present invention is a compound other than a titanium oxide, tungsten oxide and niobium oxide, then the ceramic powder may be obtained by, for example, a method of reacting a chloride, sulfate, oxysulfate or oxychloride of a metal which is to be in the resulting ceramic with an ammonia and calcining the reaction product, or a method of calcining an ammonium salt of the metal which is to be in the resulting ceramic in air.

A dispersant to be employed in a ceramic dispersion composition of the present invention may be an inorganic acid, an inorganic base, an organic acid, an organic base, and/or an organic acid salt. The examples of the inorganic acid include a binary acid (also called as a hydroacid) such as a hydrochloric acid; and an oxoacid (also called as a oxygen acid) such as a nitric acid, a sulfuric acid, a phosphoric acid, a perchloric acid and a carbonic acid. The examples of the inorganic base include an ammonia, a lithium hydroxide, a sodium hydroxide, a potassium hydroxide, a rubidium hydroxide and a cesium hydroxide. The examples of the organic acid include a monocarboxylic acid such as a formic acid, an acetic acid and a propionic acid; a dicarboxylic acid such as an oxalic acid, a glutaric acid, a succinic acid, a malonic acid, a maleic acid and an adipic acid; a tricarboxylic acid such as a citric acid; and an amino acid such as a glycine. The examples of the organic base include a urea. The examples of the organic acid salt include an ammonium carboxylate such as an ammonium acetate, an ammonium oxalate, an ammonium hydrogen oxalate, an ammonium citrate and an ammonium hydrogen citrate; a carboxylic acid salt of group Ia metals such as a lithium oxalate, a lithium hydrogen oxalate, a sodium oxalate, a sodium hydrogen oxalate, a potassium oxalate and a potassium hydrogen oxalate; a carboxylic acid salt of group IIa metals such as a magnesium oxalate; a carboxylic acid salt of group IIIa metals such as an yttrium oxalate; a carboxylic acid salt of group IVa metals such as a titanium oxalate and a zirconium oxalate; a carboxylic acid salt of group Va metals such as a vanadium oxalate; a carboxylic acid salt of group VIa metals such as a chromium oxalate, a molybdenum oxalate and a tungsten oxalate; a carboxylic acid salt of group VIIa metals such as a manganese oxalate; a carboxylic acid salt of group VIII metals such as an iron oxalate, an ammonium iron oxalate, a cobalt oxalate, a nickel oxalate, a ruthenium oxalate, a rhodium oxalate, a palladium oxalate, an osmium oxalate, an iridium oxalate and a platinum oxalate; a carboxylic acid salt of group Ib metals such as a copper oxalate, a silver oxalate and a gold oxalate; a carboxylic acid salt of group IIb metals such as a zinc oxalate; a carboxylic acid salt of group IIIb metals such as a gallium oxalate and an indium oxalate; a carboxylic acid salt of group IVb metals such as a germanium oxalate and a tin oxalate; and a carboxylic acid salt of lanthanides such as a lanthanum oxalate and a cerium oxalate. The above organic acid salt may be an anhydride thereof or a hydrate thereof.

The amount of the dispersant to be used in a ceramic dispersion composition of the present invention may be at least about 0.005 times by mole as much as the amount of the ceramic powder. As the amount of the dispersant is increased, a ceramic dispersion composition having an improved dispersion stability tends to be obtained. Therefore, the amount of the dispersant is preferably at least about 0.01 times by mole, and is more preferably at least about 0.03 times by mole as much as the amount of the ceramic powder. On the other hand, when the amount of the dispersant is too large, it may be difficult to have an effect in proportion to the amount and also a film made from the resulting ceramic dispersion composition may have insufficient hydrophilicity under light irradiation in some cases and, therefore, the amount is preferably about 400 times by mole or smaller, and is more preferably about 5 times by mole as much as the amount of the ceramic powder.

A solvent to be employed in a ceramic dispersion composition of the present invention can be any solvent as long as a dispersant to be used together with the solvent is dissolved in the solvent. The examples of the solvent include a water-based solvent such as a water, a hydrogen peroxide water; an alcohol such as an ethanol, a methanol, a 2-propanol and a butanol; a ketone such as an acetone and a 2-butanone; a paraffin compound solvent; an aromatic compound solvent and the like. Among them, a water-based solvent and an alcohol are preferred.

In the present invention, the above-mentioned ceramic powder is mixed with the dispersant and the solvent to obtain a mixture thereof. The mixing may be carried out by using an apparatus capable of dispersing the powder in the solvent. The examples of the apparatus include a medium stirring-type dispersing apparatus, a rolling ball mill, a vibrating ball mill. Among them, a medium stirring-type dispersing apparatus is preferably used. In such an apparatus, as a medium, beads of a material such as a zirconia, an alumina or a glass having a diameter of about 0.65 mm or smaller, preferably about 0.5 mm or smaller, and more preferably about 0.3 mm or smaller may be used. The mixing may be carried out dividingly in two or more steps. For example, in the first step, an apparatus containing a medium with a relatively large diameter may be used, and in the second and following steps, apparatuses containing media with successively smaller diameters may be used, to carry out the mixing. By conducting the mixing in the multi-steps, a ceramic powder can be efficiently dispersed in a solvent, which results in providing a dispersion composition containing the ceramic uniformly dispersed therein. The mixing temperature may be lower than about 90° C., is preferably about 80° C. or lower, and is more preferably about 65° C. or lower. Also, the mixing temperature may be about 10° C. or higher, and is preferably about 20° C. or higher. During or after the mixing, if necessary, the resulting mixture may be subjected to a treatment such as coarse particle removal, adjustment of the ceramic content and adjustment of pH.

In the present invention, the above-mentioned mixture or the mixture subjected to the optional treatment is heated. The heating treatment may be carried out at a temperature of about 70° C. or higher without substantially letting a solvent in the mixture out of the reaction system (which means that the heating may be carried out while suppressing a substantial loss of the solvent in the mixture).

Typically, the heating treatment is conducted without substantial evaporation of the solvent in the mixture. For example, a solvent having a high boiling point, such as a solvent having a vapor pressure of about 0.05 atmosphere or lower, preferably of about 0.01 atmosphere or lower, at the temperature in the heating treatment is utilized so as to carry out the heating without substantial evaporation of the solvent in the mixture. Alternatively, the heating treatment may be conducted in a sealed container such as an autoclave so that the solvent in the mixture is not let out of the container, or in a container equipped with a reflux condenser so that an evaporated solvent returns to the mixture though the reflux condenser by being cooled therewith.

When the heat treatment is carried out at a temperature at which a vapor pressure of the solvent is equal to or higher than the atmospheric pressure, it is preferred that the mixture is refluxed or an autoclave is employed so as to carry out the treatment without substantial evaporation of the solvent. Alternatively, the heat treatment may be carried out so that the mixture is put in a sealed container and then is heated under supercritical conditions. In the case of using an autoclave, the higher the heating temperature is, the more preferable it is. The temperature in using an autoclave is preferably about 90° C. or higher, and is more preferably about 110° C. or higher. On the other hand, when the temperature is too high, it may be difficult that the film made from the resulting ceramic dispersion composition has sufficient hydrophilicity by light irradiation and, therefore, the temperature is preferably about 300° C. or lower, and is more preferably 200° C. or lower. Meanwhile, in the case of using a container equipped with a refluxing apparatus, the heating temperature is preferably about 80° C. or higher, and is more preferably 90° C. or higher, while the upper limit is the boiling point of the solvent under the ambient pressure in the heating treatment. For example, in the case that the ambient pressure is 1 atmospheric pressure and the solvent is water, the upper limit is about 100° C. Incidentally, the heating temperature means the temperature of the mixture of a ceramic powder having a photocatalytic activity, a dispersant and a solvent. The period of time for the heating varied depending on the heating temperature or the like, and is not limited. The period of time for the heating may be about 1 minute or longer, preferably about 1 hour or longer, and may be within about 100 hours, preferably within about 10 hours.

A ceramic in a ceramic dispersion composition obtained after the heating treatment may have an average particle size of about 500 nm or smaller, preferably about 200 nm or smaller, and more preferably about 180 nm or smaller. In the ceramic dispersion composition, the ceramic may be contained in an amount of about 0.1% by weight or more, preferably of about 1% by weight or more and of about 30% by weight or less, based on the ceramic dispersion composition. The ceramic dispersion composition is used for preparing film as it is or after it is mixed with additives. The examples of the additives to be optionally mixed include a silicon oxide such as an amorphous silica and a silica sol; an aluminum oxide or hydroxide thereof such as an amorphous alumina and an alumina sol; an aluminosilicate such as a zeolite and a kaolinite; an alkaline earth metal oxide or hydroxide thereof such as a magnesium oxide, a calcium oxide, a strontium oxide, a barium oxide, a magnesium hydroxide, a calcium hydroxide, a strontium hydroxide and a barium hydroxide; a calcium phosphate; a molecular sieve; an activated carbon; and a hydroxide of a metal element such as Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La and Ce or an amorphous oxide of such a metal element. The additives may be used alone or in combination of two or more of them.

By using a ceramic dispersion composition (which may be optionally mixed with additives) of the invention, a film showing a high hydrophilicity by light irradiation can be obtained on a substrate of such as a glass, a plastics, a metal, a ceramic and a concrete. The film may be obtained by, for example, spin coating, dip coating, doctor blade coating, spraying or bushing coating. It is preferred to store the ceramic dispersion composition under the conditions free from light irradiation. For example, it is preferred to put the ceramic dispersion composition in a dark room or in a light shielding container with about 10% or less of transmittances of UV rays and visible light, respectively.

In accordance with the present invention, a ceramic dispersion composition which provids a film showing a high hydrophilicity by light irradiation is obtained. The film made from the ceramic dispersion composition can restore the surface hydrophilicity within a short time by light irradiation thereto even when the surface is covered with an oleophilic substance and the hydrophilidity is thus deteriorated.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2002-151968 filed on May 27, 2002, the Japanese Patent Application No. 2002-306672 filed on Oct. 22, 2002, and the Japanese Patent Application No. 2003-48951 filed on Feb. 26, 2003, each indicating specification, claims, drawings and summary, are incorporated herein by reference in their entirety.

EXAMPLES

The present invention is described in more detail by following Examples, which should not be construed as a limitation upon the scope of the present invention.

A crystal phase, a ratio indicating an anatase-type titanium oxide, an acetaldehyde decomposition capability and an average particle diameter, of titanium oxide are obtained by the following methods.

Crystal Phase and the Ratio (%) Indicating an Anatase-type Titanium Oxide:

X-ray diffraction spectrum of a sample titanium oxide was measured using an x-ray diffraction apparatus (trade name: "RAD-IIA", manufactured by Rigaku Denki) under the conditions as follows;

an x-ray tubular bulb: Cu,
the tube voltage: 40 kV,
the tube electricity: 35 mA,
the divergent slit: one degree,
the scattering slit: one degree,
the light receiving slit: 0.30 mm,
the sampling width: 0.020 degrees,
the scanning speed: 2.00 degree/minute, and
the number of the measuring integration frequency; one time.

The crystal phase of the sample titanium oxide was determined by thus obtained spectrum. The ratio indicating an anatase-type titanium oxide content was obtained by calculating the peak area of the maximum intensity (Miller indices 101) in the spectrum. In the calculation, an anatase-type titanium oxide (trade name: "STT-65C-S", produced by Titan Kogyo K.K.) was used as a standard sample of which ratio indicating an anatase-type titanium oxide content is set to be 100%.

Acetaldehyde Decomposition Capability of Titanium Oxide ($\mu$mol/h·g):

In a sealed-type glass reaction vessel (diameter: 8 cm, height: 10 cm, volume: about 0.5 L), was placed a 4.2-cm diameter glass Petri dish on which 0.1 g of a sample titanium oxide. The reaction vessel was filled with a mixed gas having an oxygen and a nitrogen (having oxygen/nitrogen ratio of 1/4), was sealed with 13.4 $\mu$mol of an acetaldehyde and was then irradiated with visible light using a light source which was placed at a distance of about 15 cm away from the sample. The visible light irradiation was carried out using a light source device (manufactured by USHIO INC., trade name: Optical Modulex SX-UI500XQ) which is equipped with a 500 W xenon lamp (manufactured by USHIO INC., trade name: Lamp UXL-500SX), an ultraviolet cutting filter (manufactured by Asahi Techno Glass Co., Ltd., trade name: Y-45) cutting off ultraviolet light having a wavelength of about 430 nm or shorter and an infrared light cutting filter (manufactured by USHIO INC., trade name: Supercold Filter) cutting off infrared light having a wavelength of about 830 nm or longer.

Carbon dioxide was generated when acetaldehyde was decomposed by visible light irradiation. The concentration of carbon dioxide was measured with the passage of time using a photoacoustic multi gas monitor (Model "1312", manufactured by INNOVA Inc.), and the average production rate of carbon dioxide was calculated from the alteration of the concentration for 20 minutes from the starting of the irradiation. The average production rate of carbon dioxide was used as the average decomposition rate of acetaldehyde by photocatalytic activity of the sample titanium oxide. The decomposition rate per 1 g of the sample was defined as the acetaldehyde decomposition capability of the sample titanium oxide.

Average Particle Diameter (nm):

By using a sub-micron particle size distribution measurement apparatus (trade name "N4Plus", manufactured by Coulter Inc.), the particle size distribution of a sample titanium oxide was measured, and a cumulative 50% by weight diameter was calculated. The cumulative 50% by weight diameter was defined as an average particle diameter of the sample titanium oxide.

Example 1

Preparation of Titanium Oxide Powder:

An aqueous titanium oxysulfate solution was produced by dissolving 3388 g of a titanium oxysulfate (trade name "TM crystal", appearance: white solid, produced by Tayca Corporation) in 2258 g of an ion exchanged water. Under cooling by ice, 1309 g of 35% hydrogen peroxide water was added to the above-obtained aqueous titanium oxysulfate solution, to obtain a purple red mixture. A reaction container equipped with a pH electrode and a pH controller connected to the electrode and having a function of adjusting pH constant by supplying 25% by weight ammonia water (an extra-pure reagent, produced by Wako Pure Chemical Industries, Ltd.) was filled with 4700 g of an ion exchanged water. The pH of the pH controller was set to be 4. The rate of the ammonia water supplied was set to be 50.5 ml/minute. In the reaction container, when the pH of the contents in the container became lower than the set value, ammonia water started to be supplied and the supply continued at the above-set supplying rate until the pH reaches the set value. While stirring at 145 rpm, the mixture obtained above was added at a rate of 50.6 ml/min to the reaction container to be reacted with the ammonia water supplied by the pH controller to the reaction container. At the reaction, the reaction temperature was in a range of from 25° C. to 53° C. After the reaction mixture was maintained for 1 hour while stirring, 25% by weight of an ammonia water (an extra-pure reagent, produced by Wako Pure Chemical Industries, Ltd.) was supplied thereto, to obtain a slurry. The total amount of the ammonia water supplied to the reaction container was 3746 g which corresponded to 2 times as much as the amount necessary to convert the titanium oxysulfate into a titanium hydroxide. The slurry was filtered, and the solids obtained after the filtration were washed with an ion-exchanged water and were dried at a temperature of 150° C. for 15 hours in air, to obtain a titanium oxide precursor powder. After the titanium oxide precursor powder was calcined at a temperature of 370° C. for 1 hour in air, the powder was cooled to a room temperature (about 20° C.) to obtain a titanium oxide powder. The titanium oxide powder had 81.6% of ratio indicating an anatase-type titanium oxide, 30 $\mu$mol/h·g of acetaldehyde decomposition capability, and 15% by weight of water content.

Preparation of Titanium Oxide Dispersion Composition:

In 5299 g of an ion-exchanged water, 47.6 g of an oxalic acid dihydrate (an extra-pure reagent, produced by Wako Pure Chemical Industries, Ltd.) and 55.6 g of an ammonium oxalate monohydrate were dissolved. The resulting aqueous solution and 600 g of the above-obtained titanium oxide powder were put in a medium stirring type dispersing apparatus (trade name "Dyno Mill KDL-PILOT A type", manufactured by Shinmaru Enterprises) and were mixed in the following conditions;

the medium: 4.2 kg of zirconia beads with a diameter of 0.3 mm, the stirring speed: 8 m/s peripheral speed, the circulation of the mixture in the apparatus: done, the circulation amount: 8 L/hour (25 L/hour only at the first circulation), and the total period of time for mixing: 27 minutes.

After the mixing, 260 g of the obtained mixture and ion-exchanged water 1100 g were put in a medium stirring type dispersing apparatus (trade name "Apex Mega", manufactured by Kotobuki Engineering & Manufacturing Co.) and were mixed in the following conditions;

the medium: 1.66 kg of zirconia beads with a diameter of 0.1 mm, the stirring speed: 12.6 m/s peripheral speed, the circulation of the mixture in the apparatus: done, the circulation amount: 100 L/hour, and the total period of time for mixing: 97 minutes.

The titanium oxide in the obtained mixture had anatase crystal phase with an average particle diameter of 44 nm. The 200 g of the mixture was put in an autoclave made of glass (trade name, "TEM-V1000", manufactured by Taiatsu Garasu Kogyo Co.) and was heated to a temperature of 140° C., and successively was maintained at a temperature of 140° C. for 3 hours, to carry out heating treatment and obtain a titanium oxide dispersion composition. The titanium oxide in the dispersion composition had both of anatase type crystal phase and rutile type crystal phase and had an average particle diameter of 152 nm. The amount of the dispersant, i.e. , the oxalic acid and the ammonium oxalate, in the titanium oxide dispersion composition was 0.1 mole per 1 mole of titanium oxide.

Formation of Titanium Oxide Film:

The above-obtained dispersion composition containing 2% by weight of titanium oxide was applied to one side of surfaces of a slide glass having a length of 76 mm, a width of 26 mm and a thickness of 1 mm) on a spin coater (model number "1H-D3", manufactured by Mikasa). By rotating the spin coater at 300 rpm for 3 seconds and then at 500 rpm for 20 seconds, the extra amount of the dispersion composition was removed. After that, the slide glass was dried at a temperature of 150° C. The steps of such an applying the dispersion composition onto the slide glass and drying the slide glass were repeated two times, to form a titanium oxide film on the entire surface of the slide glass.

Evaluation of Hydrophilicity of Titanium Film:

An acetone solution containing 0.2% by weight of an oleic acid was applied onto the slide glass with the titanium oxide film formed as described above. After the extra amount of the oleic acid-containing acetone solution was removed by rotating a spin coater (model number "1H-D3", manufactured by Mikasa) at 3000 rpm for 5 seconds and then at 7000 rpm for 60 seconds, the slide glass was dried at a temperature of 110° C., to produce a specimen.

With respect to the specimen, the contact angle of a water droplet was measured by employing a contact angle meter (model "CA-A", manufactured by Kyowa Interfacial Science).

After the measurement, visible light rays were irradiated to the specimen for 26 hours at a room temperature (about 20° C.) by employing a light source apparatus (trade name "Optical Modulex SX-UI500XQ", manufactured by Ushio Denki Inc.) equipped with a 500 W xenon lamp (trade name "Lamp UXL-500SX", manufactured by Ushio Denki Inc.) and further a filter for cutting UV rays with wavelength of about 430 nm or shorter (trade name "Y-45", manufactured by Asahi Techno Glass Co., Ltd.) and a filter for cutting IR rays with wavelength of about 830 nm or longer (trade name "Super Gold Filter", manufactured Ushio Denki Inc.) both attached thereto. With the specimen obtained after the irradiation, the contact angle of a water droplet was measured in the same manner as above. These measurement results of the contact angle of a water droplet are shown in Table 1.

Comparative Example 1

A titanium oxide dispersion composition was obtained in the same manner as described in preparation of titanium oxide dispersion in the Example 1, except that heating treatment using the autoclave was not carried out. The titanium oxide dispersion composition had an average particle diameter of 44 nm and anatase type crystal phase. The same process was carried out as described in formation of titanium oxide film in the Example 1 to obtain a titanium oxide film, except that the titanium oxide dispersion composition thus obtained was used. With respect to the obtained titanium oxide film, a hydrophilicity of titanium oxide film was evaluated in the same conditions as described in evaluation of hydrophilicity of titanium oxide film in the Example 1. The results are shown in Table 1.

Comparative Example 2

The same process was carried out as described in formation of titanium oxide film in the Example 1 to obtain a titanium oxide film, except that a commercially available titanium oxide dispersion composition (tradename "STS-01", solid matter concentration: 30% by weight, the average particle diameter of titanium oxide in the dispersion composition; 50 nm, produced by Ishihara Sangyo Kaisha Ltd.) was used. With respect to the obtained titanium oxide film, a hydrophilicity of titanium oxide film was evaluated in the same conditions as described in evaluation of hydrophilicity of titanium oxide film in the Example 1. The results are shown in Table 1.

TABLE 1

|  | Example 1 | Comparative Example 1 | Comparative Example 2 |
| --- | --- | --- | --- |
| Contact angle (°) of water droplet before light irradiation | 106 | 78 | 87 |
| Contact angle (°) of water droplet after 26 hour light irradiation | 16 | 21 | 48 |

Example 2

An aqueous titanium oxysulfate solution was produced by dissolving 3324 g of a titanium oxysulfate (trade name "TM crystal", appearance: white solid, produced by Tayca Corporation) in 2216 g of an ion exchanged water. Under cooling by ice, 1503 g of a 31% hydrogen peroxide water was added to the aqueous titanium oxysulfate solution, to obtain a purple red mixture. Then, the same reaction container as that used in production of titanium oxide powder in the Example 1 was filled with 4700 g of an ion-exchanged water. The pH of the pH controller installed in the reaction container was set to be 4, and the rate of the ammonia water supplied was set to be 50 ml/minute. While stirring at 158 rpm, the mixture obtained as described above was added at 50 ml/minute rate to the reaction container to be reacted with the ammonia water supplied by the pH controller to the reaction container. At the reaction, the reaction temperature was in a range of from 25° C. to 55° C. After the reaction mixture was maintained for 1 hour while stirring, 25% by weight of an ammonia water (an extra-pure reagent, produced by Wako Pure Chemical Industries, Ltd.) was supplied thereto, to obtain a slurry. The total amount of the ammonia water supplied to the reaction container was 3724 g which corresponded to 2 times as much as the amount necessary to convert the titanium oxysulfate into a titanium hydroxide. The slurry was filtered, and the solids obtained after the filtration were washed with an ion-exchanged water and were dried at a temperature of 250° C. for 5 hours in air, to obtain a titanium oxide precursor powder. After the titanium oxide precursor powder was calcined at a temperature of 450° C. for 1 hour in air, the powder was cooled to a room temperature (about 20° C.) to obtain a titanium oxide powder. The titanium oxide powder had 80.2% of ratio indicating an anatase-type titanium oxide, 23 μmol/h·g of acetaldehyde decomposition capability.

In 1537 g of an ion-exchanged water, 63.1 g of an oxalic acid dihydrate (an extra-pure reagent, produced by Wako Pure Chemical Industries, Ltd.) was dissolved. The resulting aqueous solution and 600 g of the above-obtained titanium oxide powder were put in a medium stirring type dispersing apparatus (trade name "Dyno Mill KDL-PILOT A type", manufactured by Shinmaru Enterprises) and were mixed in the following conditions;

the medium: 4.2 kg of zirconia beads with a diameter of 0.3 mm, the stirring speed: 8 m/s peripheral speed, the circulation of the mixture in the apparatus: done, the circulation amount: 8 L/hour (25 L/hour only at the first circulation), and the total period of time for mixing: 1 hour.

The titanium oxide in the obtained mixture had anatase crystal phase with an average particle diameter of 92 nm. The 120 g of the mixture was put in a flask equipped with a refluxing apparatus and was maintained at a temperature of 100° C. for 6 hours, to carry out heating treatment. The titanium oxide in the resulting dispersion composition had anatase type crystal phase and an average particle diameter of 133 nm. The amount of the oxalic acid, which is a dispersant in the titanium oxide dispersion composition, was 0.1 mole in 1 mole of titanium oxide.

A titanium oxide film was formed on one side of surfaces of a slide glass by the same process as described in formation of titanium oxide film in the Example 1, except that the above obtained titanium oxide dispersion composition was used.

Evaluation of Hydrophilicity of Titanium Film:

A n-heptane solution containing 2% by weight of an oleic acid was applied onto a surface of the slide glass with the titanium oxide film formed as described above. After the extra amount of the oleic acid-containing heptane solution was, removed by rotating a spin coater (model number "1H-D3", manufactured by Mikasa) at 3000 rpm for 5 seconds and then at 7000 rpm for 15 seconds, the slide glass was dried at a temperature of 110° C., to produce a specimen.

Figure 2:
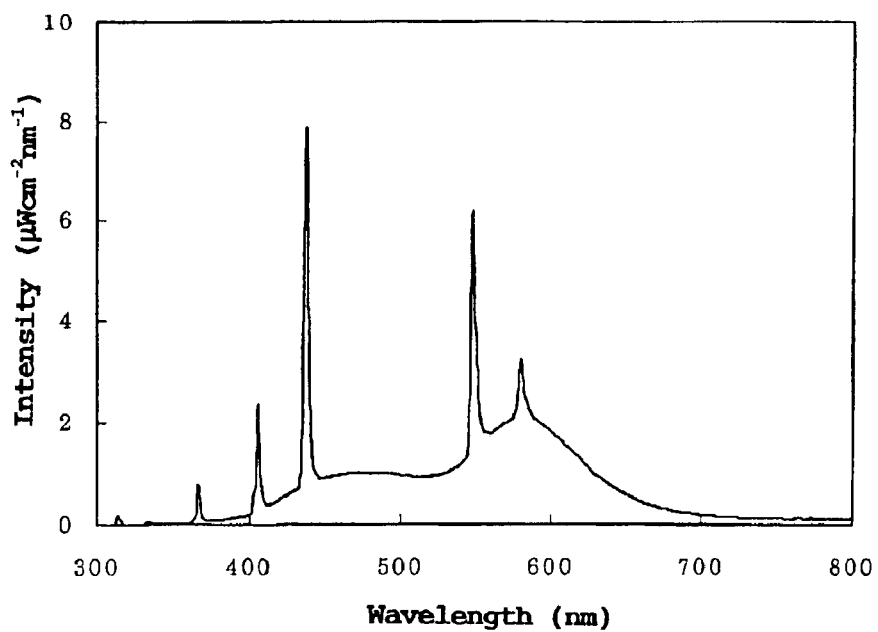
FIG. 2 shows the spectroscopic spectrum of a fluorescent lamp employed in Example 2.

With respect to the specimen, the contact angle of a water droplet was measured by employing a contact angle meter (model "CA-A", manufactured by Kyowa Interfacial Science). After the measurement, light rays were irradiated to the specimen for 3 to 30 hours at a room temperature (about 20° C.) by employing a 28 W fluorescent lamp (trade name "Full White FCL30N/28", manufactured by Matsushita Electric Industrial Co., Ltd.) which is placed at a distance of 35 cm away from the specimen. With each of the specimens obtained after the irradiation for 3 to 30 hours, the contact angle of a water droplet was measured in the same manner as above. The measured contact angles of a water droplet with the passage of time are shown in FIG. 1. The absorption spectrum of the fluorescent lamp is shown in FIG. 2.

Comparative Example 3

The same process was carried out as described in formation of titanium oxide film in the Example 1 to form a titanium oxide film on a surface of the slide glass, except that a commercially avairable titanium oxide dispersion (trade name "STS-01", produced by Ishihara Sangyo Kaisha Ltd.) was used. The hydrophilicity of the titanium oxide film in terms of the contact angles of a water droplet with the passage of time was evaluated in the same conditions as described in evaluation of hydrophilicity of titanium oxide film in Example 2. The results are shown in FIG. 1.

What is claimed is:

1. A method for producing a ceramic dispersion composition, the method comprising the step of heating a mixture of a ceramic powder having a photocatalytic activity, a dispersant and a solvent at a temperature of about 70° C. or higher, wherein the heating is conducted without substantial evaporation of the solvent.

2. A method according to claim 1, wherein the ceramic powder is a titanium oxide.

3. A method according to claim 1, wherein the ceramic powder shows an activity by irradiation of light having a wavelength of from about 430 nm to about 830 nm.

4. A method according to claim 1, wherein the dispersant is a compound selected from the group consisting of an inorganic acid, an inorganic base, an organic acid, an organic base and an organic acid salt.

5. A method according to claim 1, wherein the mixture is obtained using a medium stirring-type dispersing apparatus.

* * * * *